(12) United States Patent
Haghshanas et al.

(10) Patent No.: US 8,105,197 B2
(45) Date of Patent: Jan. 31, 2012

(54) INDEPENDENTLY MOUNTED ELECTRONIC LIMITED SLIP DEVICE FOR VEHICLE

(75) Inventors: Bahman Haghshanas, Rochester, MI (US); Hans-Peter Nett, Cologne (DE)

(73) Assignee: GKN Driveline Newton, LLC, Sterling Heights, MI (US)

( * ) Notice: Subject to any disclaimer, the term of this patent is extended or adjusted under 35 U.S.C. 154(b) by 0 days.

(21) Appl. No.: 12/905,826

(22) Filed: Oct. 15, 2010

(65) Prior Publication Data

US 2011/0113921 A1 May 19, 2011

Related U.S. Application Data

(63) Continuation of application No. 11/790,810, filed on Apr. 27, 2007, now Pat. No. 7,815,538.

(60) Provisional application No. 60/796,725, filed on May 1, 2006.

(51) Int. Cl.
*B60K 17/02* (2006.01)
(52) U.S. Cl. .......................................... 475/231; 74/607
(58) Field of Classification Search .................. 475/231; 74/607; 180/375, 378, 380; 192/112, 115
See application file for complete search history.

(56) References Cited

U.S. PATENT DOCUMENTS

| | | | | | |
|---|---|---|---|---|---|
| 4,421,187 A | * | 12/1983 | Shibata et al. | ................ | 180/375 |
| 5,080,210 A | * | 1/1992 | Hagiwara | .................... | 192/48.3 |
| 5,145,470 A | * | 9/1992 | Hagiwara | .................... | 475/230 |
| 2009/0088287 A1 | * | 4/2009 | Chludek et al. | ............... | 475/231 |

FOREIGN PATENT DOCUMENTS

| | | |
|---|---|---|
| DE | 37 38 280 A1 | 6/1989 |
| GB | 2 235 502 A | 3/1991 |
| JP | 2008-208990 * | 9/2008 |
| WO | WO 2007/133148 A3 | 11/2007 |

OTHER PUBLICATIONS

Search Report dated Dec. 5, 2007 for International Application No. PCT/US2007/01080 (2 pages).

* cited by examiner

*Primary Examiner* — Sherry Estremsky
(74) *Attorney, Agent, or Firm* — Jennifer M. Brumbaugh; Foley & Lardner LLP

(57) ABSTRACT

A device for use with a vehicle transmission system includes a housing having a clutch provided therein and a first member extending from the housing and configured for coupling to a vehicle differential. The first member includes a generally hollow tube configured to carry a rotatable shaft therein. The device does not include a second member for directly coupling the device to a transmission housing or to the differential.

20 Claims, 9 Drawing Sheets

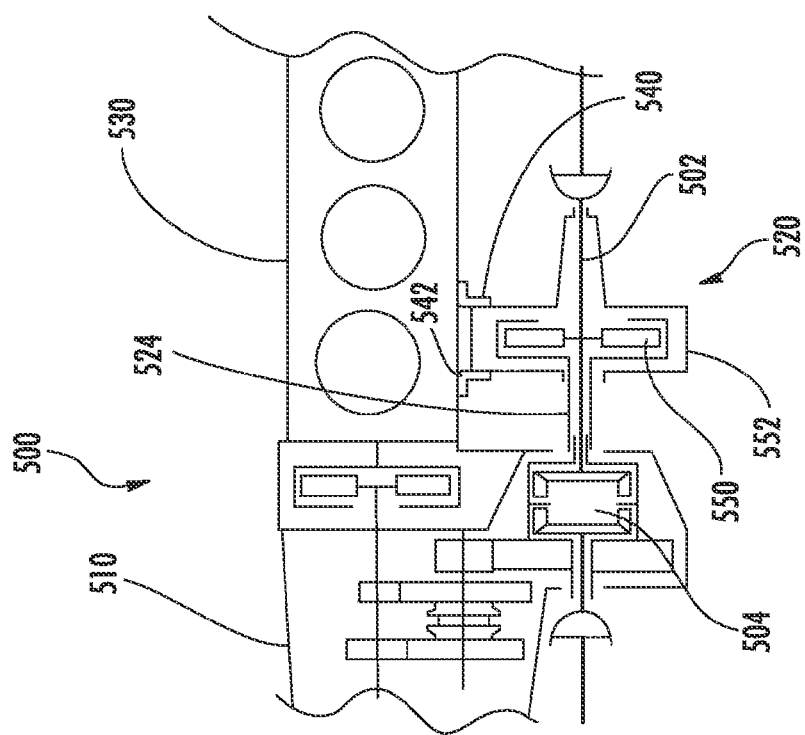
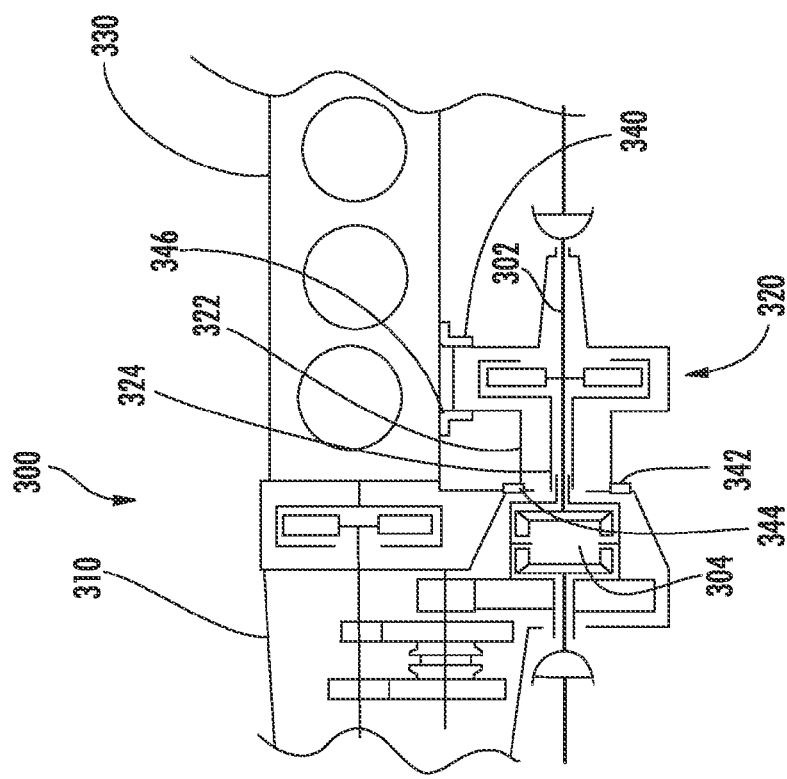
FIG. 3 (PRIOR ART)
FIG. 5

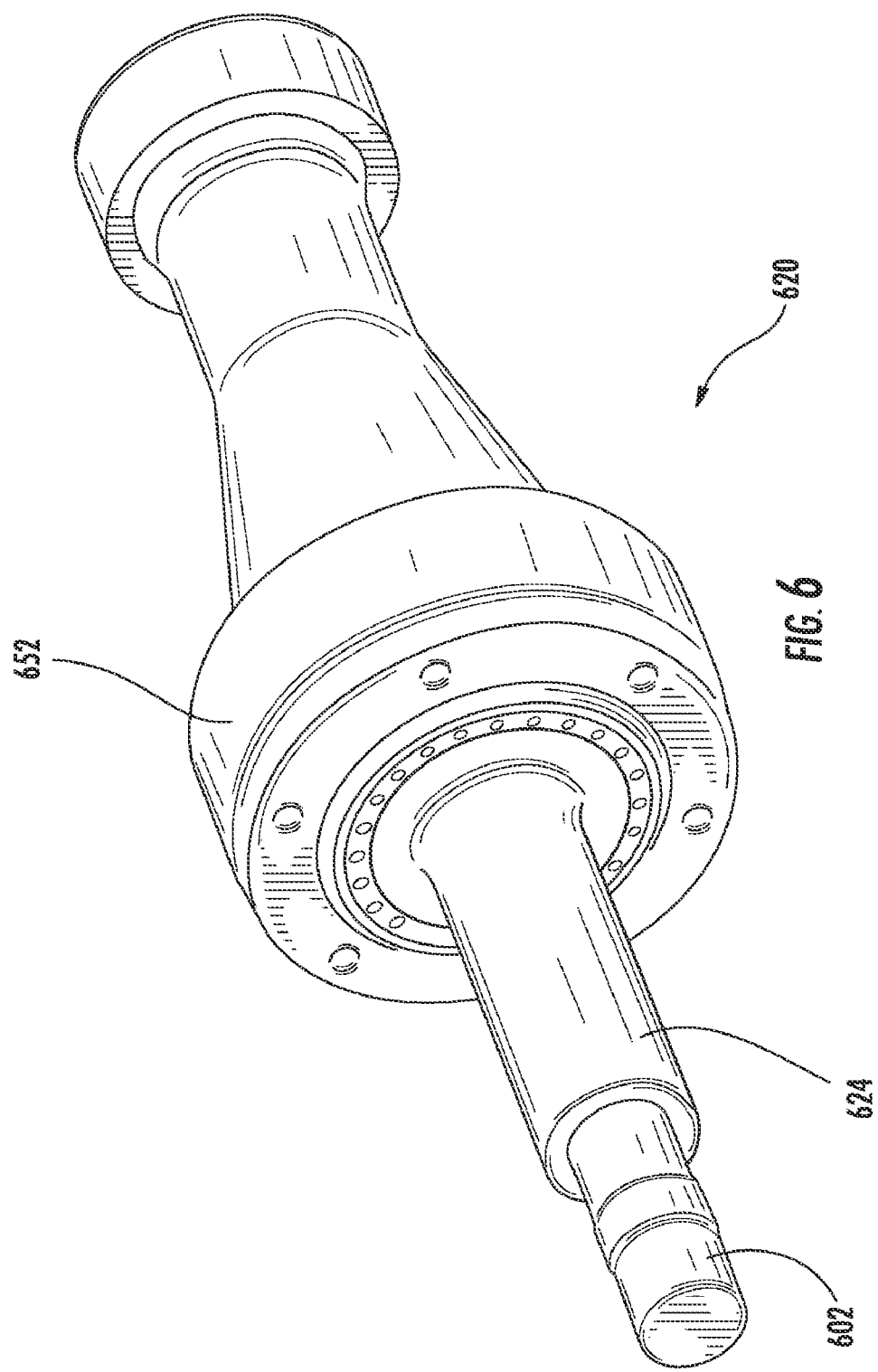

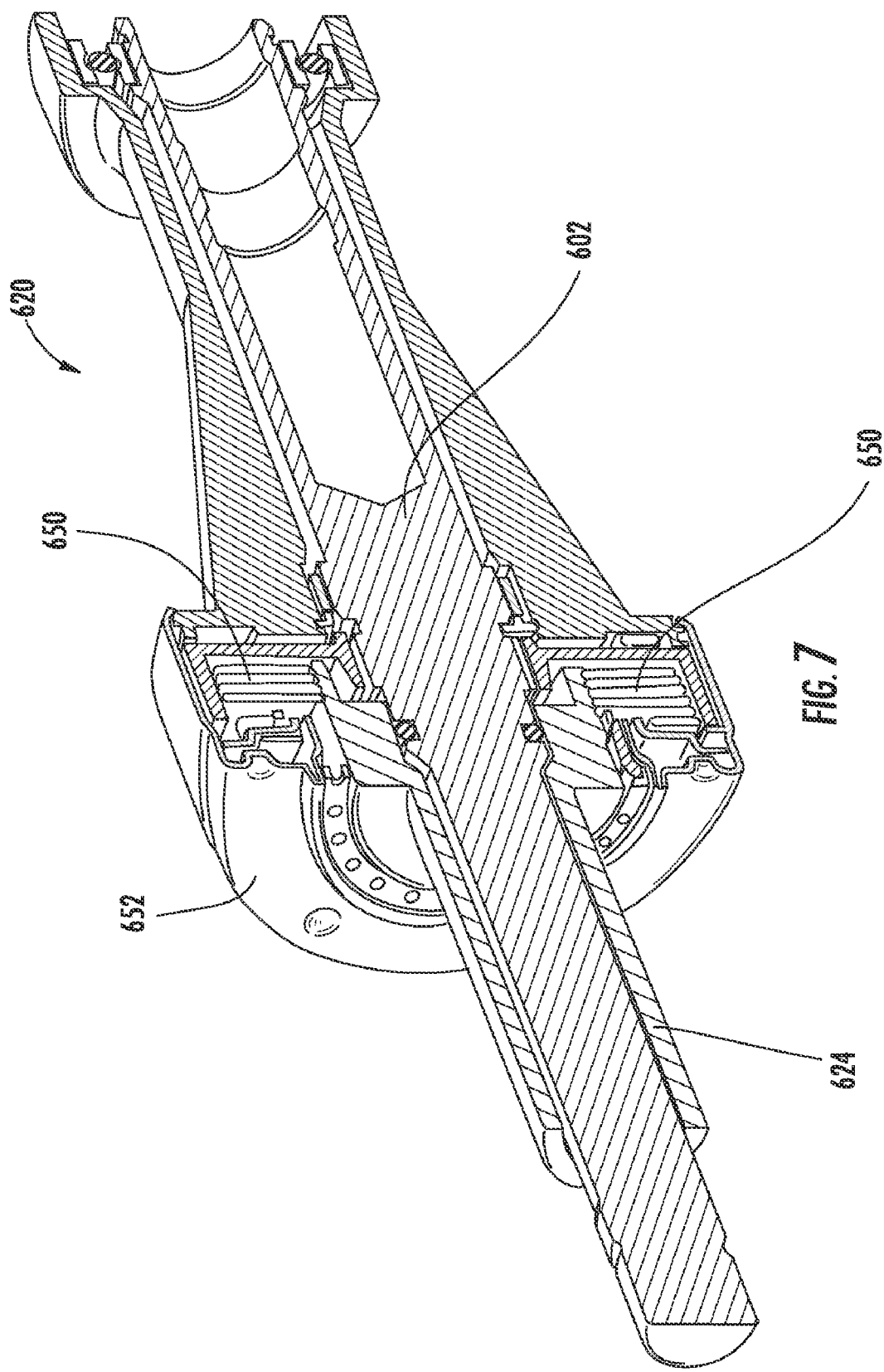

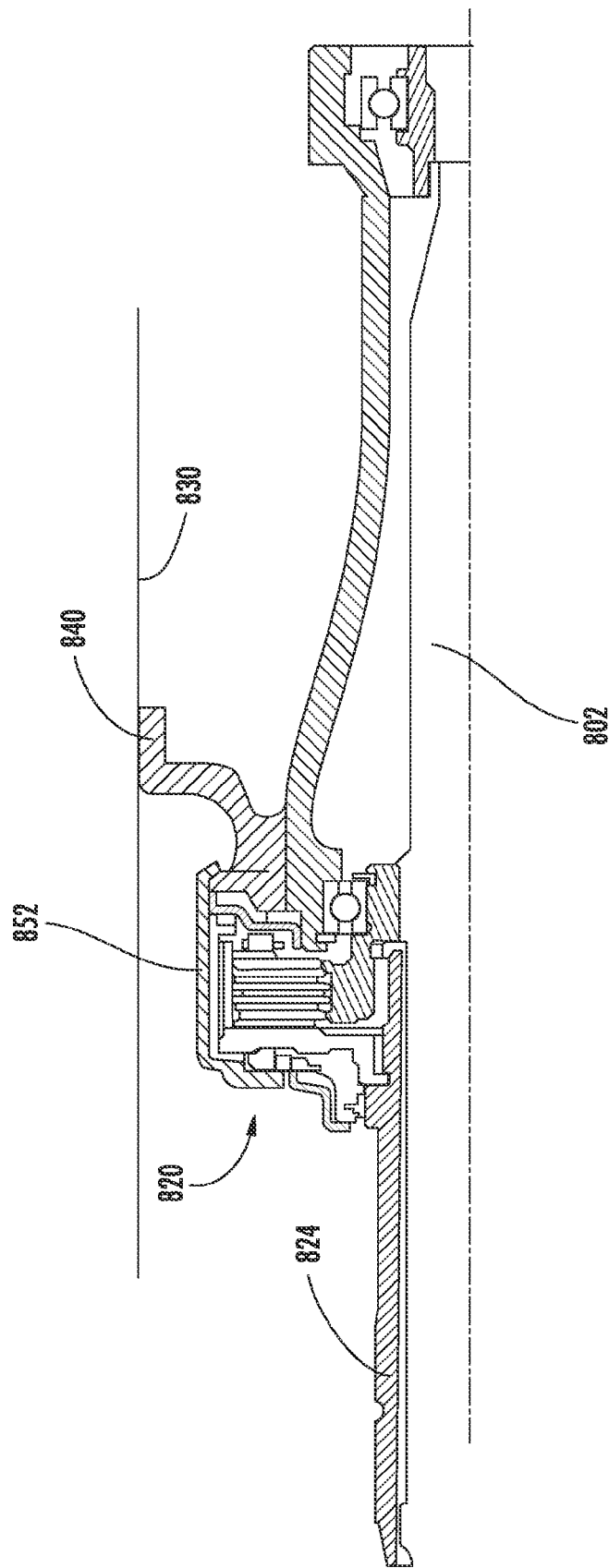

INDEPENDENTLY MOUNTED ELECTRONIC LIMITED SLIP DEVICE FOR VEHICLE

CROSS-REFERENCE TO RELATED PATENT APPLICATIONS

This application is a Continuation of U.S. patent application Ser. No. 11/790,810, filed Apr. 27, 2007, which claims the benefit of U.S. Provisional Patent Application No. 60/796,725, filed May 1, 2006. The entire disclosures of U.S. patent application Ser. No. 11/790,810 and U.S. Patent Application No. 60/796,725 are incorporated herein by reference.

BACKGROUND

The present invention relates generally to electronic limited slip devices and associated components for use with vehicle transmissions.

FIG. 1 is a schematic drawing of a portion of a vehicle 100 having an all-wheel drive transmission 110 in which a power takeoff unit (PTU) 120 is provided for transferring power from the half shaft 102 (the shaft that extends from the differential 104 to the side shaft 106) to a propshaft 108 that is coupled to the rear vehicle axle (not shown). In such a configuration, the PTU 120 is coupled or mounted to both the engine 130 at an engine mount and to the transmission housing 112 at a transmission mount (e.g., the PTU is coupled both to the engine and to the transmission with one or more brackets 140, 142, 144 that are secured in place with fasteners such as bolts, etc.). The PTU 120 is also contained within a relatively large and heavy housing 122 that is made of a metal such as steel or aluminum. One reason for the mounting of the PTU 120 to both the engine 130 and to the transmission 110 in this manner and for the inclusion of the relatively large and bulky housing for the PTU 120 is that because of the angular relationship of the propshaft 108 to the half shaft 106, relatively significant forces (e.g., torque) are present during operation of the vehicle 100.

FIG. 2 is a schematic view of a portion of a vehicle 200 having a front-wheel drive transmission 210 utilizing an electronic limited slip device 220 (eLSD). A carrier 224 is provided around a portion of the half shaft 202 proximate the location where the half shaft 202 is coupled to the differential 204. As shown in such FIGURES, the eLSD 220 is traditionally also provided in a relatively large and heavy housing 222 that is made of a metal such as steel or aluminum similar to that shown in FIG. 1 for use with a PTU 120. This housing for the eLSD 220, similar to that illustrated in FIG. 1 for the PTU 120, is conventionally mounted both to the engine 230 and to the transmission 210 with one or more brackets 240, 242, 244 that are secured in place with fasteners such as bolts, etc. FIG. 3 illustrates a similar system as shown in FIG. 2 (with like components having similar reference numerals in the 300 series) except, for example, for the fact that the shape of the carrier 324 differs from that of the carrier 224 shown in FIG. 2 and an extra mounting bracket 346 is provided to secure the eLSD 320 to the engine 330.

FIG. 4 is a more detailed schematic view of a portion of a vehicle 400 having a front wheel drive transmission utilizing an eLSD 420. A carrier 424 is the form of a hollow member is provided around a portion of a half shaft 402 proumate the location where the half shaft 402 is coupled to the differential 404 and coupled using a splined arrangement 425. The eLSD 420 includes a housing 422 that is coupled to an engine and to the transmission. A clutch 450 of the eLSD is provided within a clutch housing 452.

One disadvantage associated with currently available vehicle transmissions that utilize eLSD systems is that the housing used to enclose the eLSD is relatively large and bulky, and takes up space that may be better used for other systems, devices, or components. Another disadvantage of such systems is that the housing must be made specifically for each vehicle or platform type so that it fits within the envelope (e.g., space) provided by the vehicle manufacturer and is compatible with the other components of the transmission. Such customization may result in inefficiencies in that the housing must be redesigned and new equipment (e.g., dies) must be created in order to manufacture the housings for each of the various vehicle programs or platforms.

SUMMARY

An exemplary embodiment relates to a device for use with a vehicle transmission system that includes a housing having a clutch provided therein and a first member extending from the housing and configured for coupling to a vehicle differential. The first member includes a generally hollow tube configured to carry a rotatable shaft therein. The device does not include a second member for directly coupling the device to a transmission housing or to the differential.

Another exemplary embodiment relates to a transmission system for a vehicle that includes a transmission comprising a housing, a differential, and an electronically limited slip device comprising a clutch housing and a tubular member extending from the clutch housing. The electronically limited slip device is coupled to the differential only by the tubular member and the electronically limited slip device is not directly coupled to the housing of the transmission.

Another exemplary embodiment relates to a method for assembling a transmission system for a vehicle that includes providing an electronically limited slip device comprising a clutch housing and a tubular member extending from the clutch housing, attaching the clutch housing to a vehicle engine, and coupling the tubular member to a differential without separately coupling the electronically limited slip device to the differential or to a transmission housing.

BRIEF DESCRIPTION OF THE DRAWINGS

FIG. 3 is a schematic cross-sectional view of a portion of a vehicle having a front-wheel drive transmission utilizing a conventional electronic limited slip device illustrating the mounting of the electronic limited slip device to the engine and transmission

FIG. 5 is a schematic cross-sectional view of a portion of a vehicle having a front-wheel drive transmission utilizing an electronic limited slip device according to an exemplary embodiment.

FIG. 6 is a perspective view of an electronic limited slip device according to an exemplary embodiment.

FIG. 7 is a cutaway perspective view of the electronic limited slip device shown in FIG. 6.

FIG. 10 is another schematic cross-sectional view of an electronic limited slip device according to an exemplary embodiment.

DETAILED DESCRIPTION

Figure 1:
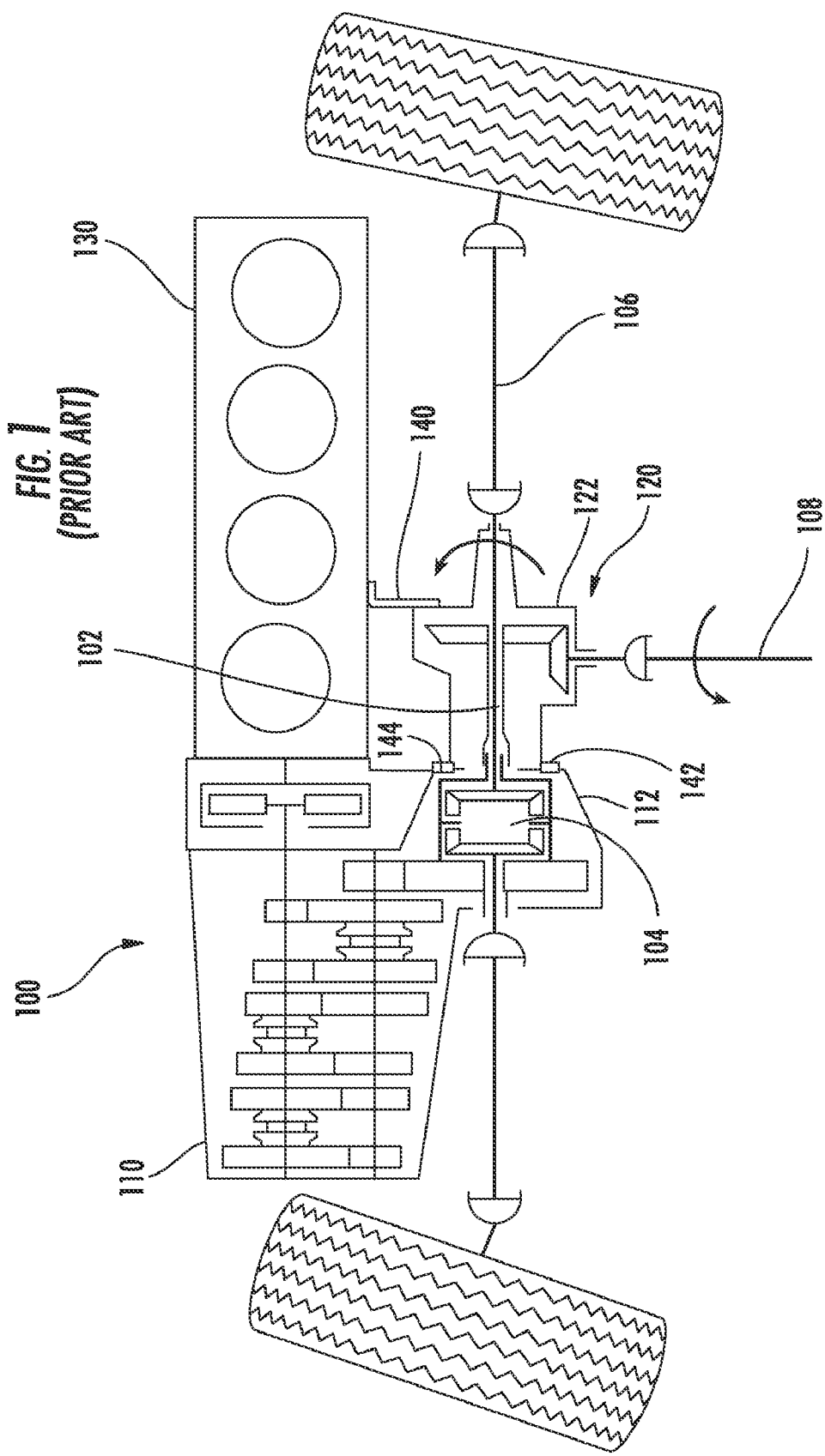
FIG. 1 is a schematic cross-sectional view of a portion of a vehicle having a conventional all-wheel drive transmission.
Figure 2:
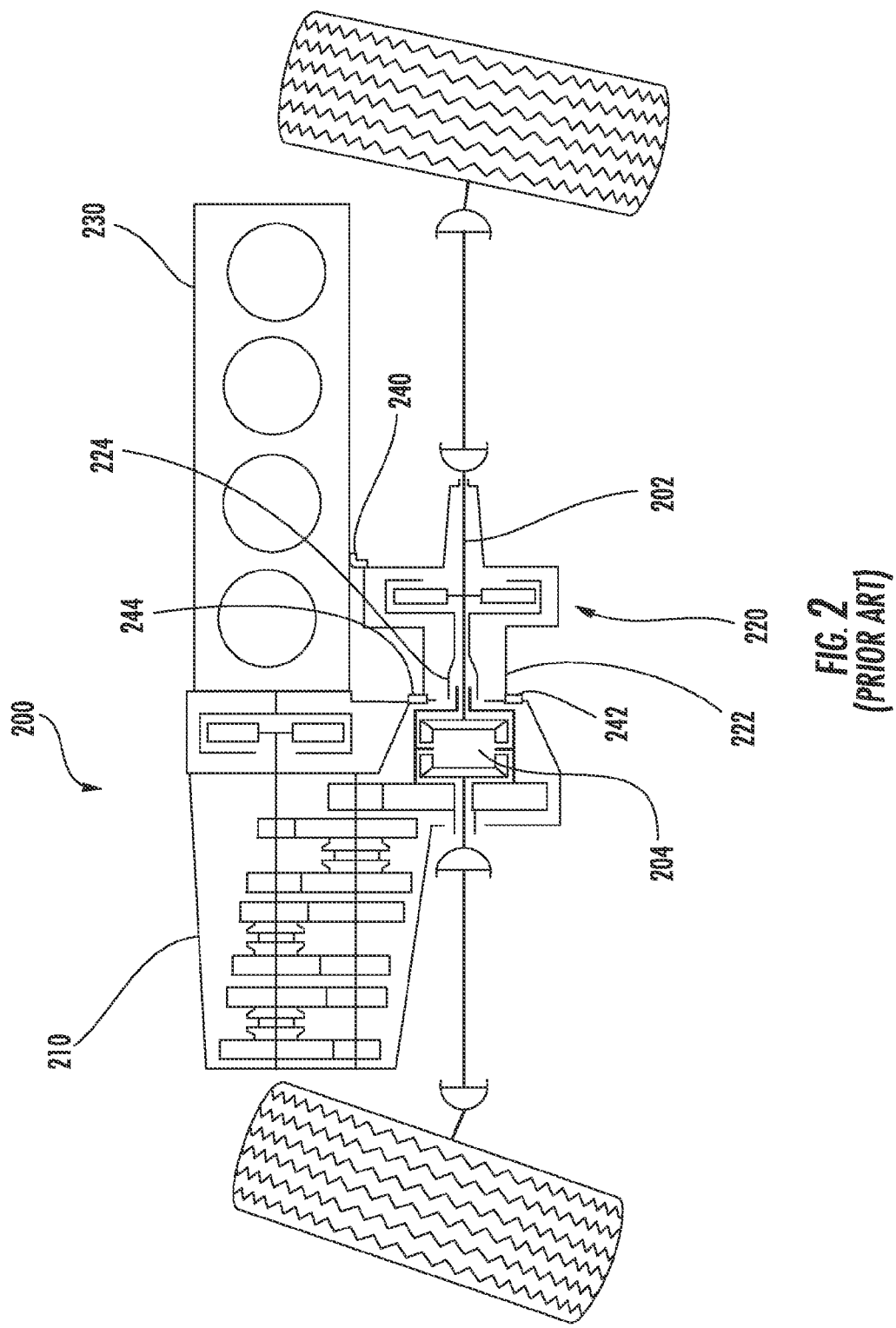
FIG. 2 is a schematic cross-sectional view of a portion of a vehicle having a conventional front-wheel drive transmission utilizing an electronic limited slip device.
Figure 4:
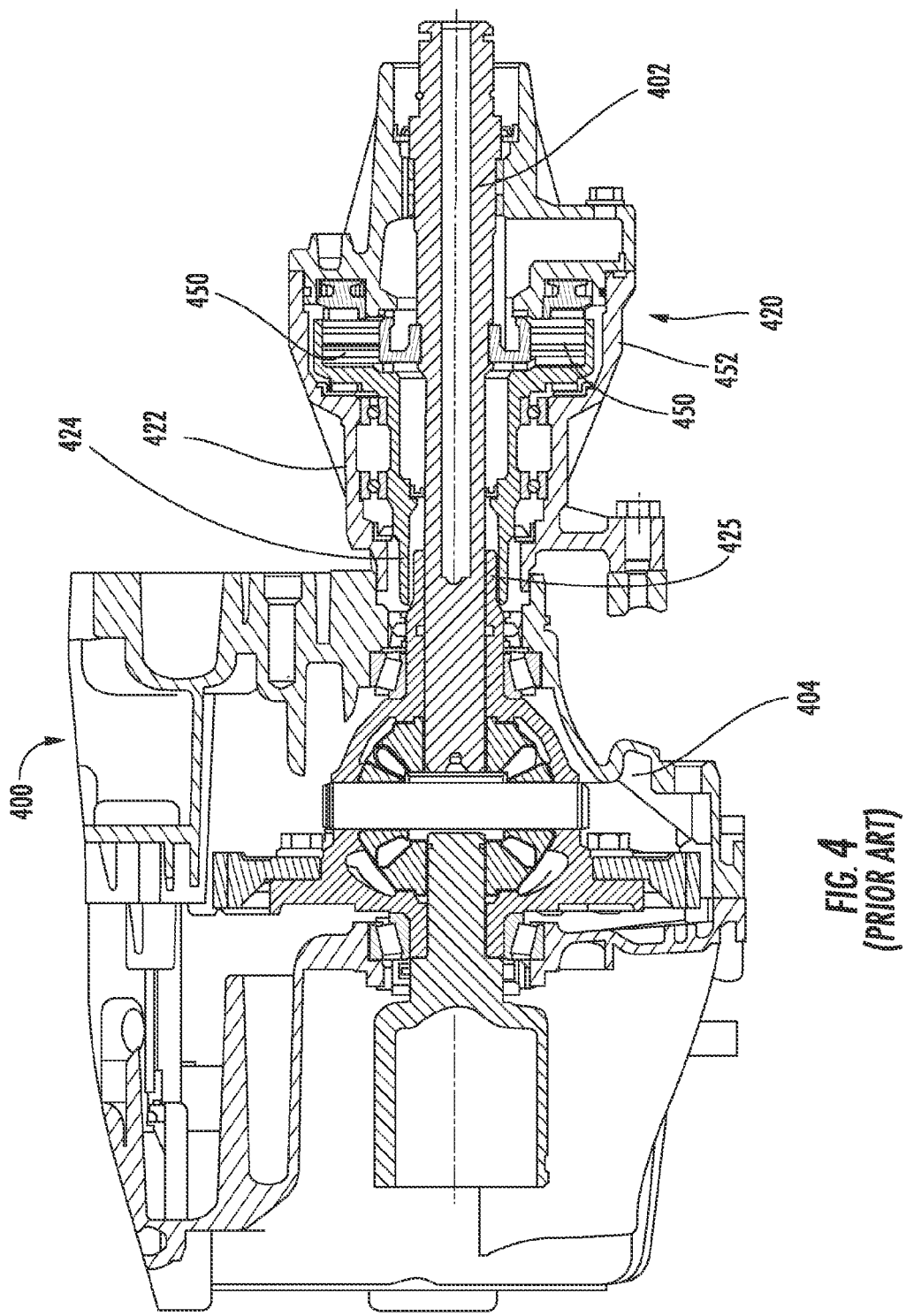
FIG. 4 is a schematic cross-sectional view of a portion of a vehicle having a front-wheel drive transmission utilizing a conventional electronic limited slip device.

According to an exemplary embodiment, an electronic limited slip device (eLSD) for a vehicle such as an automobile includes a clutch provided within a clutch housing and a carrier for a shaft coupled to the clutch housing and configured to be coupled to a portion of a transmission. The carrier is configured to couple the eLSD to the transmission without a separate housing provided around the carrier as may be used in conventional eLSD. The eLSD is also configured to be coupled to a portion of a vehicle engine (e.g., by brackets). Such an eLSD system may be used with a variety of vehicle programs or platforms without the need to design a new, custom, housing for each new vehicle program or platform (e.g., the eLSD system may be used interchangeably on a variety of different types of vehicle programs or platforms). Such an eLSD system may be used with a variety of vehicle programs or platforms without the need to design a new, custom, housing for each new vehicle program or platform (e.g., the eLSD system may be used interchangeably on a variety of different types of vehicle programs or platforms).

Another exemplary embodiment relates to a transmission system for a vehicle that includes a transmission and an eLSD. The eLSD is mounted to a vehicle engine using brackets or other fasteners. The eLSD also includes a carrier for a vehicle shaft that is coupled to a portion of the transmission without a separate housing. The carrier is configured to receive a male member of the transmission therein. Either the male member or the carrier may include splines or ribs configured for receipt in grooves or channels provided in the other of the male member or carrier to couple the carrier to the male member.

FIG. 5 is a schematic view of a portion of a vehicle 500 having a front-wheel drive transmission 510 utilizing an eLSD 520 according to an exemplary embodiment. According to such an embodiment, the portion of the housing 552 that conventionally would have been provided proximate the location where the half shaft 502 is coupled to the differential 504 (see, e.g., housing 322 in FIG. 3) is not provided such that the eLSD 520 is coupled to an engine 530 using brackets 540, 542 or similar means and there is no need to provide direct attachment of the eLSD 520 to the transmission 510. The carrier 524 that is conventionally provided in the same region has been retained.

The inventors have recognized that because the eLSD 520 does not transfer power between the front-mounted transmission 510 and the rear axle (as is the case in the case of a PTU 120 as shown in FIG. 1), there are no significant forces (e.g., torques) that are applied to the eLSD 520. In other words, as compared to the PTU 120 used in the system shown in FIG. 1, there are relatively few forces applied to the eLSD 520. Accordingly, the inventors have discovered that it is possible to remove a significant portion of the housing 552 (e.g., housing 322 shown in FIG. 3) without producing degradation to the performance of the eLSD 520 or the transmission 510.

Thus, as shown in FIG. 5, while the eLSD 520 remains mounted to the engine 530 using brackets 540, 542 and fasteners similar to those used in conventional transmission systems, the eLSD 520 is not enclosed in a housing 552 in the area proximate the location where the half shaft 502 is coupled to the differential 504. A carrier 524 (e.g., a hollow cylinder or tube) similar to that shown in FIG. 3 is still utilized according to an exemplary embodiment for providing protection for the spinning half shaft 502.

FIG. 6 is a perspective view of an eLSD 620 according to an exemplary embodiment that may be used in conjunction with a system such as that shown in FIG. 5. The eLSD 620 includes a carrier 624 for protecting the half shaft 602, but does not include a housing surrounding the carrier 624. The clutch housing 652 is configured to be secured by a bracket (not shown) or other means to the engine.

Figure 8:
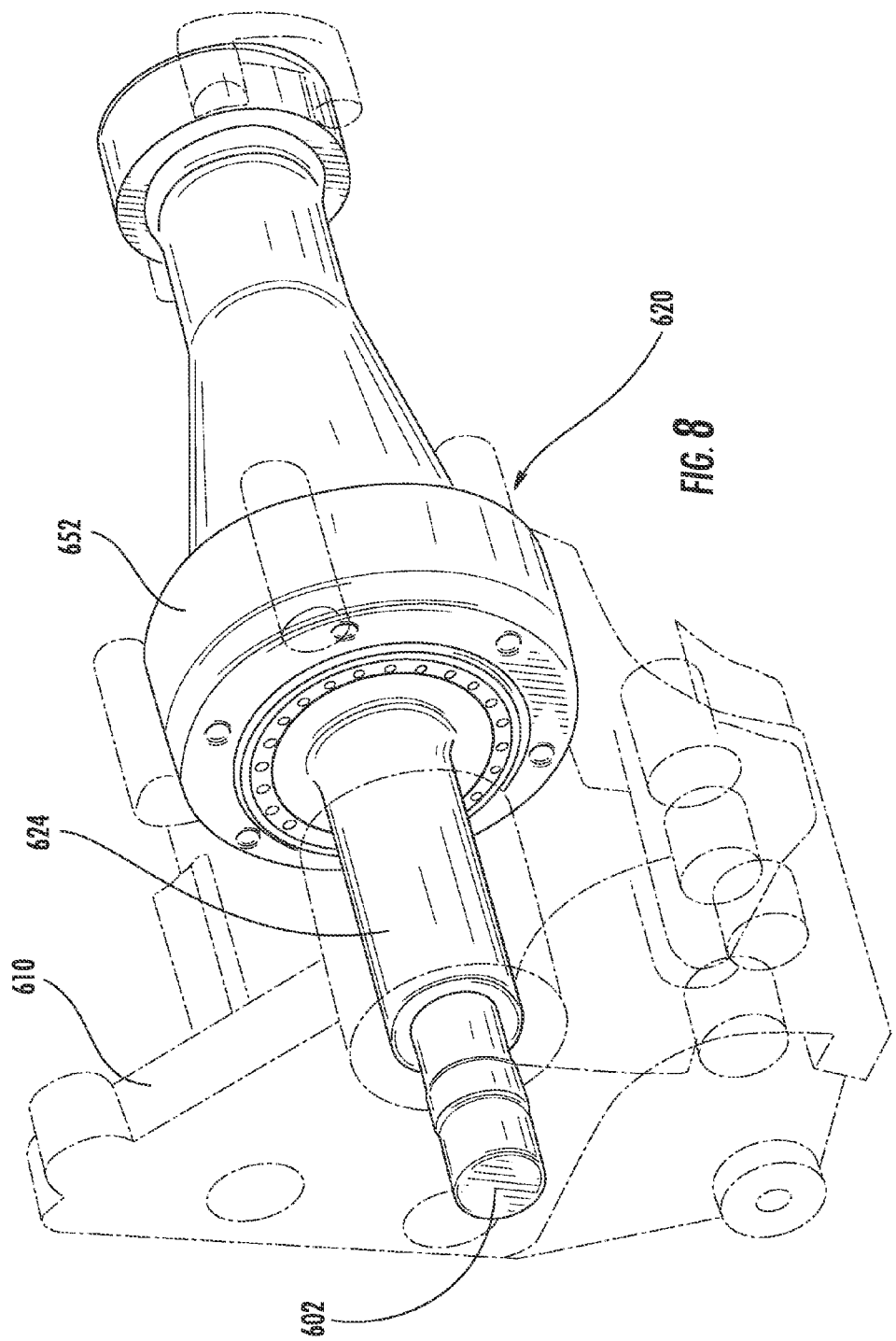
FIG. 8 is a perspective view of the electronic limited slip device shown in FIG. 6 provided within a transmission envelope according to an exemplary embodiment.

FIG. 7 is a cutaway perspective view of the eLSD 620 shown in FIG. 7 showing the clutch 650 and half shaft 602 provided within the eLSD 620. FIG. 8 illustrates the mounting of the eLSD 620 shown in FIGS. 6 and 7 to a transmission system 610 (e.g., the eLSD 620 is shown as being provided within the envelope or space of a transmission system) 610.

Figure 9:
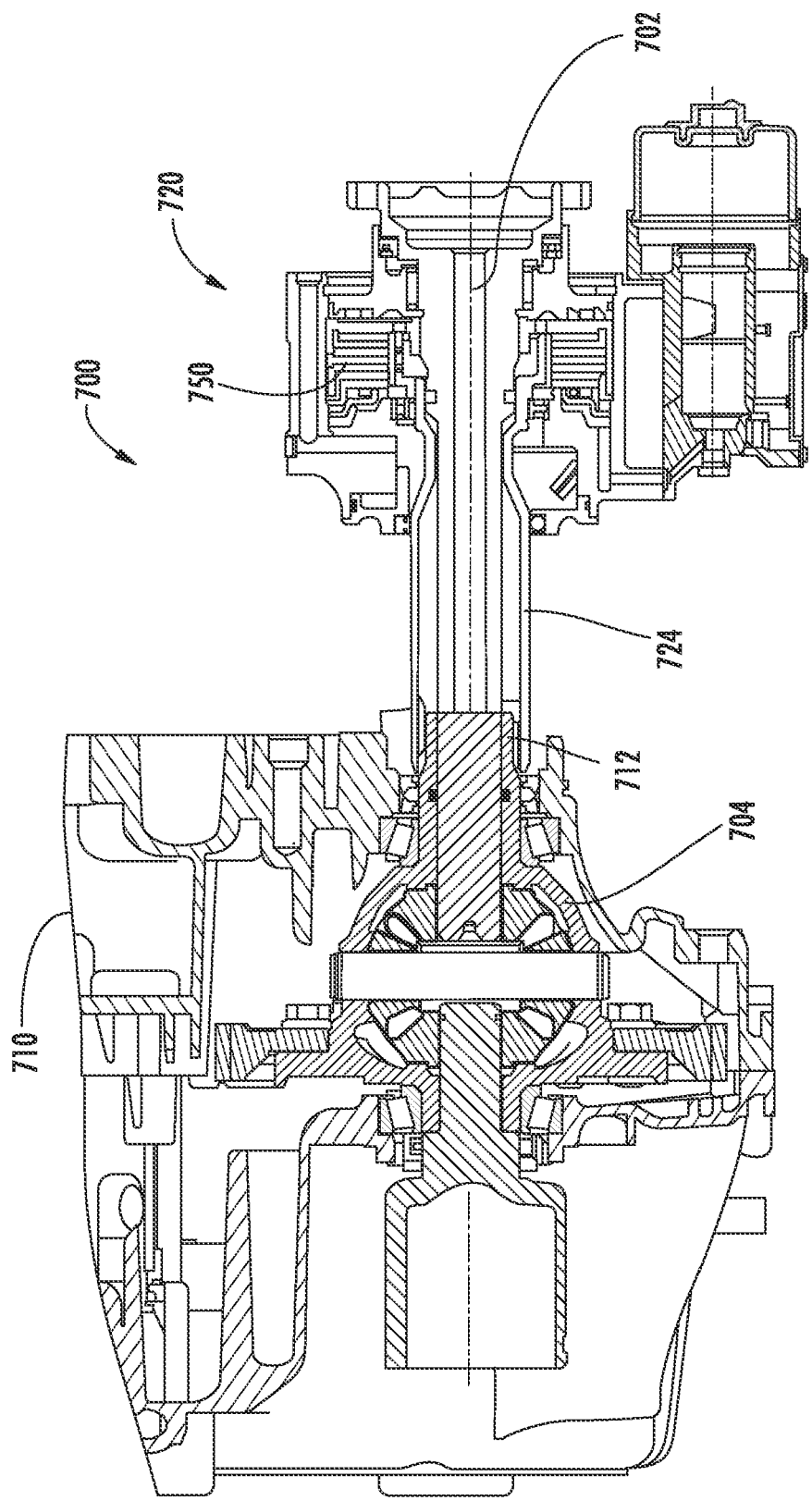
FIG. 9 is a schematic cross-sectional view of an electronic limited slip device according to an exemplary embodiment.

FIG. 9 illustrates a schematic cross-sectional view of a portion of a vehicle 700, and shows the use of an eLSD 720 similar to that shown in FIGS. 6-8 according to an exemplary embodiment. The carrier 724 of the eLSD is connected directly to a portion of the transmission without the need for brackets or other fasteners. According to an exemplary embodiment, a portion 712 of the transmission 710 is provided as a male member that is received within the carrier 724, which acts as a female member for receiving the male member. The male member includes splines or ribs around the outer surface thereof that are received by grooves or channels formed on the interior surface of the carrier 724. It should be understood that according to other exemplary embodiments, the position of these components may be reversed (e.g., the carrier may be a male member that is received within a female member of the transmission) and that the splines may be provided on the carrier (with grooves or channels provided in the portion of the transmission to which the carrier is coupled).

FIG. 10 illustrates a cross-sectional view of a portion of a system such as that shown in FIG. 9 in which a portion of the half shaft 802, carrier 824, and eLSD 820 are shown. As illustrated in FIG. 10, a mounting bracket 840 may be provided as being coupled to or integrally formed with the clutch housing 852 of the eLSD 820. The bracket 840 may be coupled or secured to the engine 830 using fasteners such as bolts and the like.

According to other exemplary embodiments, the carrier may be additionally secured to the transmission using brackets or the like to provide additional stability for the eLSD. One advantageous feature of eliminating the housing that normally surrounds the carrier is that a relatively significant weight savings may be realized (e.g., the weight of the metal used to form the housing in this region). Another advantageous feature is the elimination of the necessity to make custom housings depending on the particular vehicle application in which the eLSD will be used. By coupling the carrier directly to the transmission, the carrier may be used interchangeably with a variety of different vehicle programs or platforms.

Still another advantageous feature of eliminating the housing is that the space external to the carrier in the region formerly occupied by the housing may be used for other components of the transmission. For example, cooling channels, electronics, and/or other components may be mounted proximate the carrier. In this manner, the overall space taken by the transmission and its associated components may be reduced, to allow for the use of the eLSD in a transmission having a smaller package envelope.

It is important to note that the construction and arrangement of the electronic limited slip device and related components as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the preferred and other exemplary embodiments without departing from the scope of the present inventions.

What is claimed is:

1. An electronic limited slip device for a vehicle powertrain comprising:
    a rotatable shaft configured to couple to a differential of a transmission;
    a clutch housing having a clutch disposed therein and being configured to couple to an engine; and
    a carrier generally disposed around the shaft and extending from the clutch housing;
    wherein the carrier is configured to protect the rotatable shaft and is configured to couple to a transmission housing by a female member comprising channels and a male member comprising splines; and
    wherein the female member is configured to receive the male member, and wherein the channels are configured to receive the splines.

2. The electronic limited slip device of claim 1, wherein the carrier comprises the female member, and wherein the transmission housing comprises the male member.

3. The electronic limited slip device of claim 1, wherein the carrier comprises the male member, and wherein the transmission housing comprises the female member.

4. The electronic limited slip device of claim 1, wherein the electronic limited slip device is configured such that at least one of cooling channels, electronics, and other vehicle components may be mounted proximate the carrier.

5. The electronic limited slip device of claim 1, wherein the clutch housing is configured to couple to the engine with at least one of fasteners and brackets.

6. A transmission system for a vehicle comprising:
    a transmission comprising a differential and a transmission housing; and
    an electronic limited slip device, comprising:
        a rotatable shaft configured to couple to the differential;
        a carrier generally disposed around the shaft and configured to couple to the transmission housing; and
        a clutch disposed within a clutch housing, the clutch housing being configured to couple to an engine;
    wherein the carrier extends from the clutch housing and is coupled to the transmission housing by a female member comprising channels and a male member comprising splines, wherein the female member received the male member, and wherein the channels received the splines.

7. The powertrain of claim 6, wherein the carrier comprises the female member, and wherein the transmission housing comprises the male member.

8. The powertrain of claim 6, wherein the carrier comprises the male member, and wherein the transmission housing comprises the female member.

9. The powertrain of claim 6, wherein the electronic limited slip device is configured such that at least one of cooling channels, electronics, and other vehicle components may be mounted proximate the carrier.

10. The powertrain of claim 6, wherein the electronic limited slip device is configured to couple to the engine with at least one of fasteners and brackets.

11. A method for providing an electronic limited slip device for a vehicle, the vehicle comprising a transmission and an engine, comprising:
    providing a clutch housing and a carrier extending from the clutch housing;
    disposing a clutch within the clutch housing;
    disposing a shaft within the carrier, such that the carrier protects the shaft;
    configuring the clutch housing to couple directly to the engine; and
    providing the carrier with a splined member for coupling the carrier to a transmission housing.

12. The method of claim 11, wherein providing the carrier with a splined member comprises providing a splined male member configured to be received by a female splined member of the transmission housing.

13. The method of claim 11, wherein providing the carrier with a splined member comprises providing a splined female member configured to receive a male splined member of the transmission housing.

14. The method of claim 11, wherein configuring the clutch housing to couple directly to the engine comprises at least one of providing fasteners or providing brackets.

15. The method of claim 11, further comprising:
    coupling the clutch housing to the engine; and
    coupling the carrier to the transmission housing.

16. The method of claim 15, further comprising providing the transmission housing with a splined member.

17. The method of claim 16, wherein:
    providing the carrier with a splined member comprises providing a splined male member;
    providing the transmission housing with a splined member comprises providing a splined female member having channels; and
    coupling the carrier to the transmission housing comprises disposing the male member into the female member, such that splines of the male member are received by channels of the female member.

18. The method of claim 16, wherein:
    providing the carrier with a splined member comprises providing a splined female member having channels;
    providing the transmission housing with a splined member comprises providing a splined male member; and
    coupling the carrier to the transmission housing comprises disposing the male member into the female member, such that splines of the male member are received by channels of the female member.

19. The method of claim 15, wherein coupling the carrier to the transmission housing comprises at least one of coupling with fasteners and coupling with brackets.

20. The method of claim 15, further comprising mounting at least one of cooling channels, electronics, or other vehicle components proximate the carrier.

* * * * *